INVENTORS
M. L. JOHNSON
D. E. LUPFER
BY
*Young · Duff*
ATTORNEYS

United States Patent Office 3,408,261
Patented Oct. 29, 1968

3,408,261
CONTROL SYSTEM FOR FRACTIONAL DISTILLATION HAVING A NON-LINEAR FUNCTION GENERATOR
Merion L. Johnson and Dale E. Lupfer, Bartlesville, Okla., assignors to Phillips Petroleum Company, a corporation of Delaware
Filed Aug. 20, 1965, Ser. No. 481,302
8 Claims. (Cl. 202—160)

ABSTRACT OF THE DISCLOSURE

The internal reflux of a fractionator is non-linearly manipulated as a function of the feed flow utilizing a nonlinear function generator which converts a signal representative of the feed flow to the fractionator to a signal which is non-linearly representative of the internal reflux necessary in the fractionator, the latter signal being employed as an input to an internal reflux computer.

This invention relates to a new and improved method and apparatus for a control system wherein a desired process variable to be regulated is computed from measurements of process conditions. In one aspect, this invention relates to new and improved method and apparatus for the nonlinear manipulation of internal reflux of a fractionator as a function of the feed flow to that fractionator.

A number of automatic control systems have been developed which rely upon the computation of a desired value of a process variable from measurements of the selected process conditions. For example, one such control system manipulates the flow of external reflux to the fractionator in response to a computed value of internal reflux, i.e. the external reflux returned to the fractionator plus the vapor which is condensed near the top of the fractionator by the subcooled external reflux. Generally, the computation of internal reflux is made from measurements of the temperature differential between the vapors removed from the top of the column and the external reflux returned to the column and measurement of another process variable. The rate of flow of external reflux to the fractionator is regulated in response to computed values based upon the measured temperature differential and at least one other process variable. Heretofore, the change of the rate of flow of external reflux to the fractionator has been linearly related to the measured process variables. Thus, if the process variable other than the temperature differential above described increased in magnitude a certain amount thereby requiring additional reflux in the fractionator, the rate of flow of external reflux to the fractionator was increased in an amount directly proportional to the first-mentioned increase.

Also heretofore, when the feed rate to a fractionator fluctuated, the vapor loading and therefore the efficiency of the fractionator fluctuated and in order to maintain desired product composition, manual resetting of the internal reflux to feed ratio was necessary based on tables and/or graphs or other data supplied from experimental operation of the fractionator. Normally, a value of the internal reflux to feed ratio is set for a feed rate in a given range and if, as is often the case, the feed rate varies continually, the internal reflux to feed ratio must be set at the maximum value required within the expected range of feed flow if no off-specification product is to be made. This type of operation does not sufficiently economize in the use of the utilities, i.e. external heating, cooling and the like, provided to the system, and the products formed thereby are often not as close to the minimum specification as they could be.

It has now been found that by the nonlinear manipulation of the internal reflux of a fractionator as a function of the feed flow to that fractionator, utility requirements for the system are reduced by allowing operation closer to minimum specification. Also, the capacity of the fractionator will be increased by allowing operation closer to the flood point of the fractionator and the operator's attention required to control the fractionator will be reduced by automatically performing corrections presently made manually.

By this invention, the flow rate of the feed to the fractionator is measured and a signal representative of that flow rate is formed and then converted to a second signal which is representative of the nonlinear response required to meet any fluctuation in the rate of flow of the feed and thereby maintain desired process conditions in the fractionator and consistently produce specification-meeting products.

The apparatus of this invention includes a feed flow sensing means which produces a signal representative of the rate of feed flow sensed, and a nonlinear function generator means which converts the feed flow signal to a second signal which is nonlinearly representative of the internal reflux necessary within the fractionator to maintain desired compositions of products from that fractionator notwithstanding feed flow rate fluctuations.

Accordingly, it is an object of this invention to provide a new and improved method and apparatus for a control system wherein a desired process variable can be regulated as computed from the measurement of process conditions. Another object of this invention is to provide a new and improved method and apparatus for nonlinearly manipulating the internal reflux of a fractionator as a function of the feed flow to that fractionator.

Other aspects, objects, and the several advantages of the invention will be apparent to those skilled in the art from the description, drawing, and the appended claims.

Figure 1:
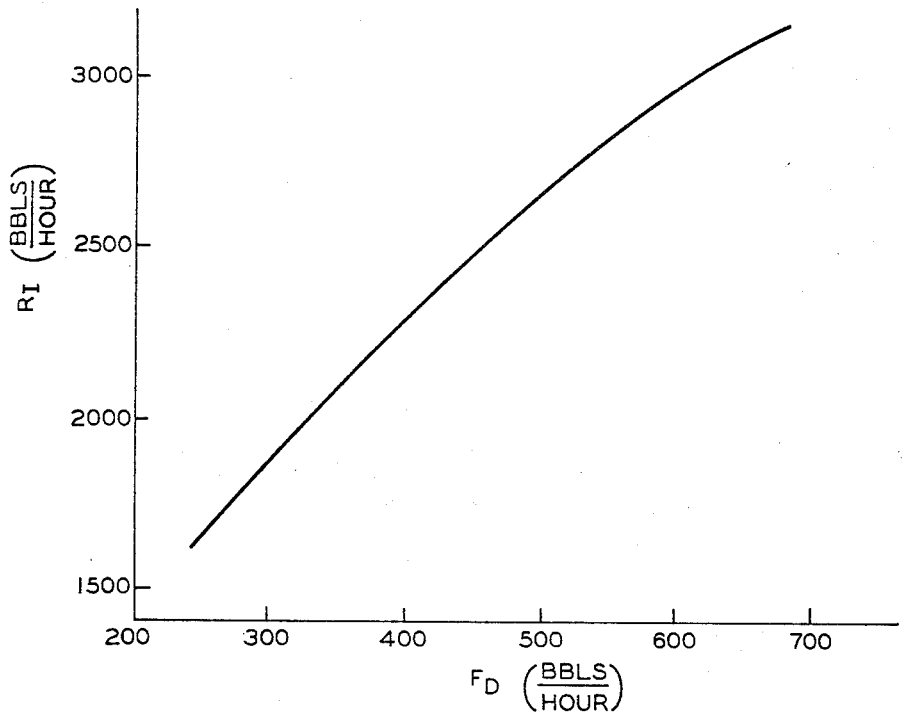
FIGURE 1 is a graphic representation of the relationship of the internal reflux of a fractionator to the feed to that fractionator.

In FIGURE 1 there is shown a graph embodying typical experimental data obtained from operating a fractionator with varying feed rates and determining the internal reflux necessary to maintain a desired product or products composition for that feed rate. Typically, the relationship between the internal reflux and the feed rate is nonlinear. Thus, each incremental increase in feed rate does not require, on the contrary dictates against, a directly proportional increase in internal reflux.

Figure 2:
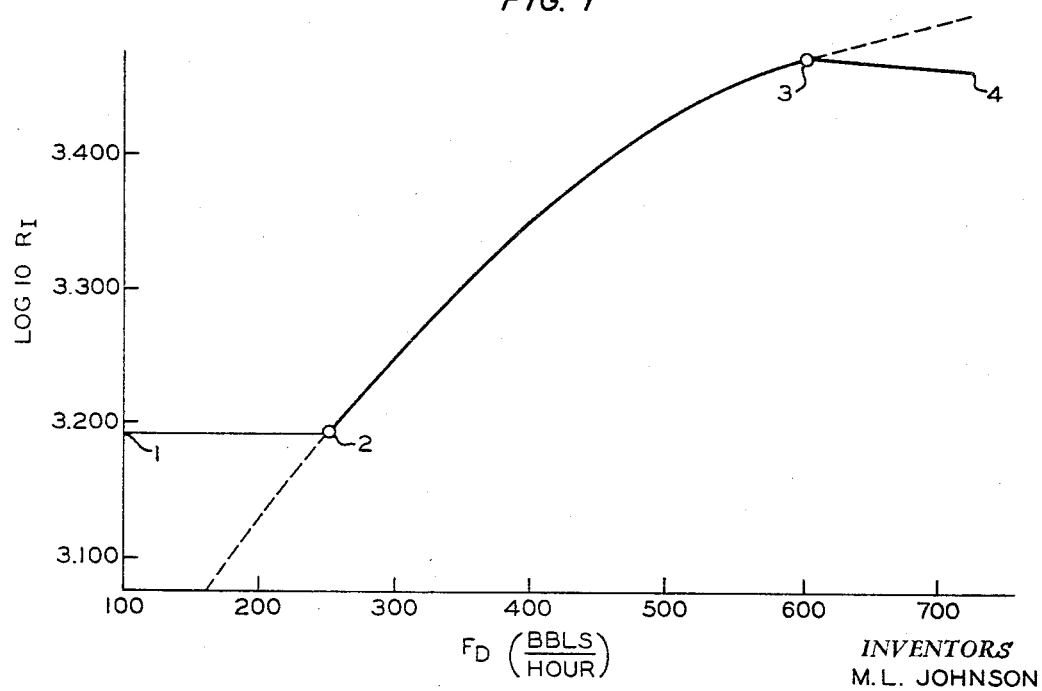
FIGURE 2 is a graphic representation of the relationship of the internal reflux to the feed of a fractionator according to one embodiment of this invention.

In FIGURE 2 there is shown a graph which embodies the desired operating characteristics of the fractionator. The curved line between points 2 and 3 represents the curve of FIGURE 1. Each point on that line represents the value of the internal reflux for its corresponding feed flow rate which is as close as possible to minimum specifications thereby allowing maximum economy in the use of the utilities and capacity of the fractionator system. The horizontal part of the graph between points 1 and 2 represents the lowest internal reflux rate that can be tolerated and still maintain the desired composition of the fractionator products. The internal reflux value for line 1, 2 will, as with other values shown on the graph, vary from fractionator to fractionator. However, the value will generally be that which will maintain the desired composition of fractionator products when no or substantially no feed is passing into the fractionator. Maintaining the fractionator at this value of internal reflux simplifies startup of the fractionator when feed does finally start passing thereinto again after a period of shutdown.

That part of the graph represented by the line between points 3 and 4 represents, starting at point 3, the area in which the feed flow is so high that the fractionator simply does not have the capacity to contain both the feed and the internal reflux necessary to effect the desired separation. Thus, with feed flows beyond point 3 the addition of internal reflux in accordance with the dotted line would cause flooding of the fractionator and therefore prevent any separation of the feed at all. Rather than to flood the fractionator, the product, relative to the specification requirements, is sacrificed while still effecting a separation of the feed by decreasing the amount of internal reflux within the fractionator. Thus, the line between points 3 and 4 slopes downwardly so that less internal reflux flows downwardly in the fractionator when more feed is passed into that fractionator.

As can be seen from FIGURE 2, the internal reflux of the fractionator is nonlinearly related to and therefore is a nonlinear function of the feed flow rate. Thus, since:

$R_I = R_E(1 + K\Delta T)$ where $R_I$ is the internal reflux flow rate, $R_E$ is the external reflux flow rate, $K$ is a parameter which is equal to $C_p/\lambda$ ($C_p$ being the specific heat of the external reflux and $\lambda$ being the heat of vaporization of the liquid on the top tray of the fractionator) and $\Delta T$ is the difference in temperature between the vapors removed from the top tray of the fractionator and the external reflux passing into the fractionator;
then $$\frac{R_I}{1+K\Delta T} = \frac{f(F_D)}{1+K\Delta T}$$

where $F_D$ represents the feed flow rate to the fractionator.

Thus, since the internal reflux of the fractionator can be considered to be a function of the feed flow rate (nonlinear, FIGURE 2), the external reflux needed to provide the internal reflux desired for the fractionator is also a function of the feed flow rate.

Therefore, a reflux computer which receives a measurement of the differential temperature between the vapors removed from the top tray of the fractionator and the external reflux to that fractionator and which utilizes a desired internal reflux set point to calculate a needed external reflux value can be employed to operate on the last-mentioned equation above. Such a computer is fully and completely disclosed in our U.S. application 165,965, filed Jan. 12, 1962, and now U.S. Patent 3,271,270, issued Sept. 6, 1966. The predictive internal reflux computer of this patent receives the temperature differential and requires an internal reflux set point. The computer then provides an output signal which is used as a set point for a flow controller which controls the rate of flow of external reflux into the fractionator. According to this invention the internal reflux set point for the computer is determined automatically and nonlinearly from the feed flow rate to the fractionator and automatically applied to the computer.

Figure 3:
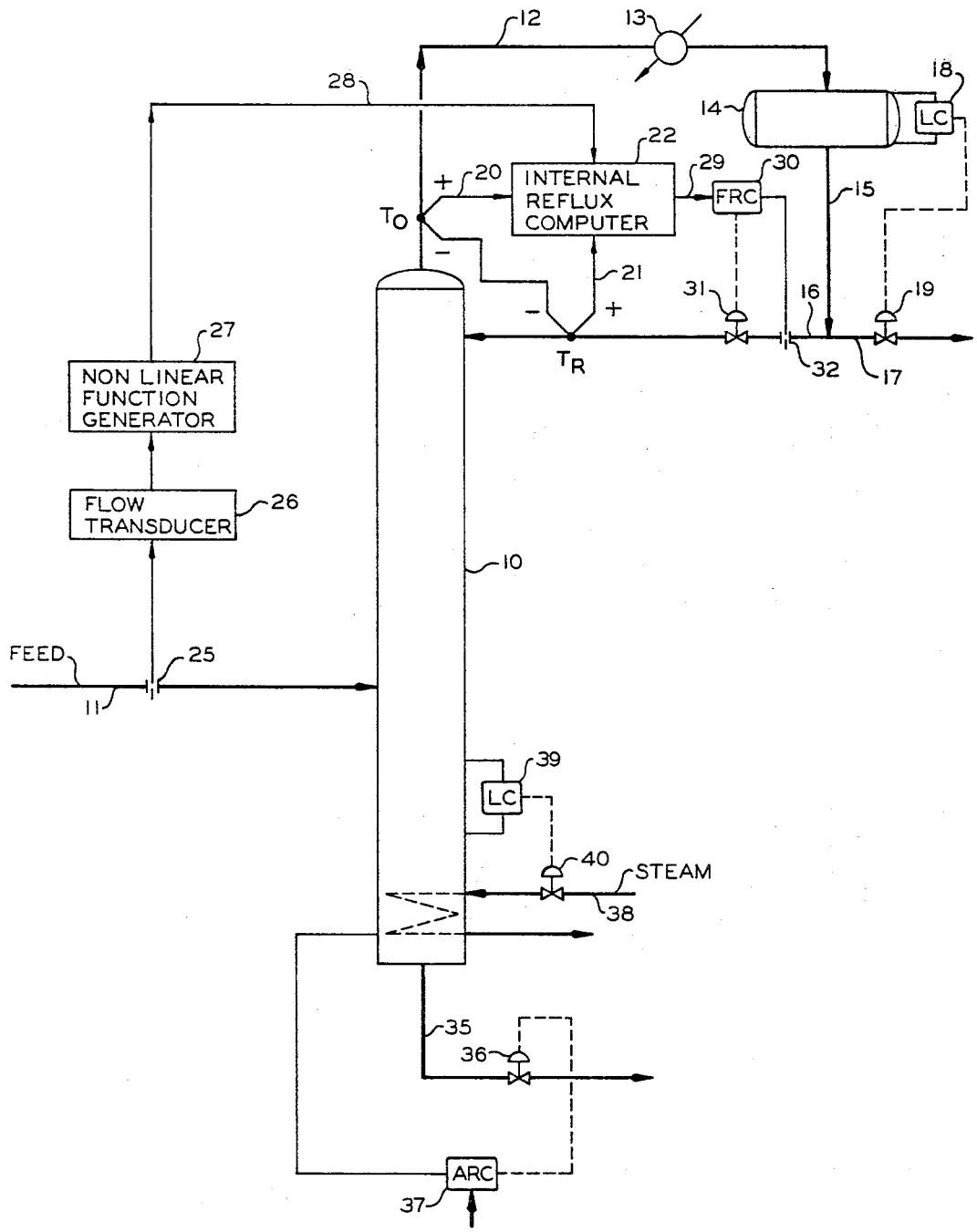
FIGURE 3 is a schematic representation of a system embodying this invention.

FIGURE 3 shows a fractionator 10 into which a feed mixture is passed through line 11 and from which the overhead vapor is removed through line 12, cooled and condensed by heat exchanger 13 and passed into accumulator 14. The overhead condensate is removed from accumulator 14 through line 15 and passed either into line 16 or line 17 or both. The rate of flow of overhead product through line 17 is controlled by liquid level controller 18 which is operatively connected to accumulator 14 and to motor valve 19. Line 16 returns the liquid therein to fractionator 10 and therefore constitutes the actual external reflux for 10. Conventional temperature and sensing elements such as thermocouples are connected at points $T_O$ and $T_R$ to measure the temperature of the vapors or overhead removed from the top tray of 10 and the temperature of the actual external reflux being returned to 10, respectively. Signals representative of these temperatures are then passed by lines 20 and 21 to internal reflux computer 22 which, as stated before, can be the computer disclosed in our copending U.S. application.

A conventional flow sensing device 25 is operatively connected to line 11 and to a conventional linear flow transducer 26 which, for example, converts the sensed flow to a signal representative of that flow rate ($F_D$). This signal is then passed through a nonlinear function generator 27 into which is programmed a graph similar to that shown in FIGURE 2 which graph was obtained by experimental operation of fractionator 10. Based upon the first signal which is representative of the flow rate, nonlinear function generator 27 generates a second signal which is representative of the internal reflux value that corresponds to the feed flow rate value of the first signal as determined by the graph programmed thereinto. Thus, the second signal which is the output of nonlinear function generator 27 is nonlinearly representative of the feed flow rate to fractionator 10 and constitutes the desired internal reflux flow rate based on the measured feed flow rate. This desired internal reflux is then passed by 28 into computer 22 as the internal reflux set point to that computer.

As disclosed in our patent, computer 22 produces a signal proportional to the external reflux desired based on the measured temperature differential and the desired internal reflux and passes that signal by 29 to flow recorder-controller 30 wherein it is used as the set point. Then, in cooperation with the external reflux rate of flow as measured by conventional linear flow element 32, controller 30 manipulates the position of control valve 31 so that the rate of flow ordered by set point 29 is achieved. Nonlinear function generator 27 is any known apparatus which by electrical, pneumatic, hydraulic, mechanical and other means converts a first signal to a second signal based upon a nonlinear relationship of those signals. For this specific example, an electronic nonlinear function generator that can be used in this manner is a variable diode function generator, type 16.271 produced by Electronic Associates, Inc., Long Branch, New Jersey.

In order to manipulate the process streams associated with the bottom of fractionator 10 compatibly with the above instrumentation, line 35 which is utilized to remove the kettle product from fractionator 10 has therein a motor valve 36 which is operatively connected to a conventional analyzer recorder controller 37 which in turn receives a sample stream or is otherwise operatively connected to the bottom portion of fractionator 10. Analyzer recorder controller 37 analyzes the composition of a sample from or near the kettle product of 10 and controls the rate of flow of removal of the kettle product in response to this analysis and a desired value thereof. Reboiling heat is passed into fractionator 10 through line 38 such as by steam, the amount of heat passing into fractionator 10 being controlled by liquid level controller 39 which is operatively connected to motor valve 40 and to the lower portion of fractionator 10 so as to maintain a desired level therein. It should be noted that this invention can be employed to control a process variable associated with the bottom of fractionator 10 instead of, as shown in FIGURE 3, a process variable associated with the top of fractionator 10. For example, instead of controlling the external reflux returned to fractionator 10, a nonlinear function generator can be employed in conjunction with a heat input computer to nonlinearly manipulate the heat input to a fractionator. Such a heat input computer is fully and completely disclosed in U.S. Patent 3,177,125, issued to D. E. Berger on Apr. 6, 1965.

It should also be noted that although the computing elements of this invention were described relative to the use of electronic analog apparatus, the control apparatus, including computer 22, may utilize electronic, pneumatic, hydraulic, mechanical or other analogy, or digital techniques can be employed where desired in the practice of this invention. It should also be noted that, if desired, conventional lag apparatus can be employed in line 28 or in the line between elements 26 and 27 to slow the rate of travel of signals from and/or to computer 22, in order to allow the feed rate measured at 25 to enter fractionator 10 before any responsive manipulation of motor valve 31 is carried out.

*Example*

A conventional fractionator for separating isobutane from normal butane was employed which received a feed stream comprising 0.8 weight percent propane and lighter, 28.0 weight percent isobutane, 70.7 weight percent normal butane, 0.5 weight percent isopentane and heavier at a feed rate of 500 barrels per hour to produce as the distillate a stream containing no less than 95 percent isobutane and as the bottom product a stream containing no less than 98 percent normal butane.

The fractionator operated with an overhead temperature of about 150° F., a reflux temperature of about 120° F., a bottoms temperature of about 178° F., a feed temperature of about 140° F., and a column pressure of about 150 p.s.i.a.

The external reflux flow rate was 2220 barrels per hour which, at the conditions of operation of the fractionator, produced an internal reflux flow rate of 2550 barrels per hour. Therefore, the internal reflux to feed ratio was 5.1 to 1.

This operation produced a distillate product from the fractionator containing 95.2 weight percent isobutane, 2.8 weight percent propane and lighter, and 2.0 weight percent normal butane. This distillate product was produced at the rate of about 143 barrels per hour. The bottom product contained 98.3 weight percent normal butane, 0.7 weight percent isopentane and heavier, and 1.0 weight percent isobutane. The bottom product was produced at a rate of about 357 barrels per hour.

When the feed rate was decreased to 400 barrels per hour and the feed composition and operating conditions of the fractionator were maintained substantialy constant, it was found impossible to meet the specifications of at least 95 weight percent isobutane with no more than 2 weight percent normal butane in the distillate product, and of no less than 98 weight percent normal butane with no more than 1 weight percent isobutane in the bottoms product. Not being able to meet specifications was due to the poorer separation ability of the column under reduced loading since the internal reflux to feed ratio was maintained constant at the 5.1 ratio whereby the internal reflux was lowered to 2040 barrels per hour by the decrease in feed rate. With the 400 barrels per hour feed rate it was found that if the spectification for the bottom product composition was met so that the bottom product contained no more than 1.0 weight percent isobutane, the overhead product then contained 8 weight percent normal butane and thus did not meet the specification of 2.0 weight percent normal butane. In this operation the overhead product contained 89.4 weight percent isobutane, 8.0 weight percent normal butane, and 2.6 weight percent propane and lighter, which did not meet the specification, even though the bottom product contained 98.3 weight percent normal butane, 1.0 weight percent isobutane, and 0.7 weight percent isopentane and heavier, which did meet the specification. The overhead product was produced at the rate of about 122 barrels per hour and the bottom product was produced at the rate of 278 barrels per hour. The external reflux supplied was 1775 barrels per hour thereby producing an internal reflux of 2040 barrels per hour to satisfy the desired 5.1 to 1 internal reflux to feed ratio.

Similarly, when the feed rate and composition and the fractionator operating conditions were maintained substantially constant and the specification for the distillate product was met, the bottom product was found to contain 1.7 weight percent isobutane and did not meet specifications. The distillate product met specifications in that it contained 95.2 weight percent isobutane, 2.0 weight percent normal butane and 2.8 weight percent propane and lighter, but the bottom product did not meet specifications in that it contained 97.6 weight percent normal butane, 1.7 weight percent isobutane, and 0.7 weight percent isopentane and heavier. The distillate product was produced at a rate of about 112 barrels per hour and the bottom product was recovered at the rate of about 288 barrels per hour. Here also the external reflux was 1775 barrels per hour so that the internal reflux was 2040 barrels per hour to satisfy the desired internal reflux to feed ratio of 5.1 to 1.

By the operation of this invention when the feed rate is decreased from 500 to 400 barrels per hour the external reflux is decreased nonlinearly so that the new internal reflux to feed ratio will differ from the previous ratio so as to meet the important requirements of the fractionator, those of producing both distillate and bottom products of specified composition at the decreased feed rate. By this invention, the internal reflux, rather than being decreased from 2550 barrels per hour to 2040 barrels per hour as above, is decreased from 2550 barrels per hour to 2240 barrels per hour to thereby provide an internal reflux to feed ratio of 5.6 to 1. With this new, nonlinearly-adjusted, internal reflux to feed ratio, the distillate product obtained contains at least 95 weight percent isobutane and no more than 2 weight percent normal butane while the bottom product contains at least 98 weight percent normal butane with no more than 1 weight percent isobutane. The distillate product and bottom product are obtained at rates of 114 and 286 barrels per hour respectively which, it may be observed, are decreased in direct proportion to the decrease in feed rate from 500 to 400 barrels per hour, both products in both cases meeting their specifications.

Thus, it can be seen that, by this invention, the fractionator is operated so that it is refluxed nonlinearly as related to feed rate and therefore will produce substantially constant specification products.

Reasonable variations and modifications are possible within the scope of this disclosure without departing from the spirit and scope thereof.

We claim:

1. In a fractionation system, fractionator means, means for removing a vapor stream from the upper region of said fractionator, means for cooling said removed vapor stream to condense at least a portion thereof, means for returning at least a portion of the resulting condensate to the fractionator as external reflux, internal reflux computer means for controlling the rate of flow of said resulting condensate which is returned, said internal reflux computer utilizing as its input the desired flow rate of internal reflux in the fractionator and at least one other process variable, means for generating a first signal proportional to the flow rate of feed mixture into said fractionator, means operatively connected to said generating means for converting said first signal to a second signal which is nonlinearly representative of the internal reflux required to maintain the desired separating ability of the fractionator regardless of feed mixture flow rate changes, the nonlinear representation being of the configuration shown in FIGURE 2 between points 2 and 3, and means for employing said second signal as the desired internal reflux input to said computer.

2. In a fractionation system, fractionation means, means for removing a vapor stream from the upper region of said fractionator, means for cooling said vapor stream to condense at least a portion thereof, means for returning at least a portion of the resulting condensate to the fractionator as external reflux, internal reflux computer means for controlling the amount of said resulting condensate which is returned, said internal reflux computer utilizing as its inputs (1) the temperature of the vapors removed from the upper region of said fractionator and the temperature of the external reflux returned to said fractionator and (2) the desired flow rate of internal reflux in the fractionator, means for measuring the flow of feed to said fractionator, means for generating a first signal proportional to the measured flow rate of said feed, means operatively connected to said generating means for converting said first signal to a second signal representative of the nonlinear internal reflux response required to maintain desired product compositions substantially the same regardless of feed mixture flow rate changes, the nonlinear representation being of the configuration shown in FIGURE 2 between points 2 and 3, and means for employing said second signal as a desired internal reflux input to said computer.

3. Apparatus according to claim 2 wherein said means for converting said signal to a second signal includes means for limiting said second signal to a minimum value and means for reducing the magnitude of said second signal after a maximum point is reached.

4. In a fractionation system, fractionation means, means for removing a vapor stream from the upper region of said fractionator, means for cooling said vapor stream to condense at least a portion thereof, means for returning at least a portion of the resulting condensate to said fractionator as external reflux, internal reflux computer means for controlling the rate of return of said resulting condensate, said internal reflux computer utilizing as its input (1) a temperature differential between vapors removed from the fractionator and the external reflux passing into the fractionator and (2) the desired rate of flow of internal reflux in the fractionator, conduit means for passing feed into said fractionator, a flow sensing means operatively connected to the said conduit means, a flow transducing means operatively connected to said flow sensing means and adapted to form a first signal representative of the feed flow rate, a nonlinear function generator operatively connected to said transducer means and adapted to receive the signal from the said flow transducer means and to produce a second signal representative of the internal reflux required by said fractionator for the flow rate measured based upon a nonlinear relationship between the internal reflux of said fractionator and said flow rate of said feed including minimum internal reflux rates for feed rates below a predetermined value and internal reflux rates that decrease in magnitude with feed rates above a predetermined maximum value, the nonlinear representation being of the configuration shown in FIGURE 2 between points 2 and 3, and means for employing said second signal as the internal reflux input for said internal reflux computer.

5. Apparatus according to claim 4 wherein said first and second signals are pneumatic.

6. The apparatus according to claim 4 wherein first and second signals are electric.

7. The apparatus according to claim 4 wherein said first signal is pneumatic and said second signal is electric.

8. In combination, a fractionator, a feed conduit to said fractionator, a reflux conduit to said fractionator, a vapor conduit from said fractionator, temperature sensing means in said reflux conduit and said over-head vapor conduit, a computer, means for operatively connecting said computer to said temperature sensing means to enable said computer to operate upon the temperature differential between the temperatures sensed by said means and compute $1+K\Delta T$ where K is the specific heat of the external reflux to the fractionator divided by the heat of vaporization of the liquid on the top tray of the fractionator, a flow sensing means operatively connected to said feed conduit, a flow transducer operatively connected to said flow sensing means and adapted to form a first electric signal representative of the rate of flow of feed in said feed conduit, a variable diode function generator operatively connected to the output of said flow transducer and adapted to receive said first signal and produce therefrom a second signal nonlinearly related to the flow rate sensed and representative of the internal reflux necessary for the fractionator to treat feed at the sensed flow rate and maintain the product composition of at least one product of the fractionator substantially the same as the specification requirement for that at least one product, the nonlinear representation being of the configuration shown in FIGURE 2 between points 2 and 3, said second signal being between a predetermined minimum signal representative of the minimum flow rate of internal reflux required to keep producing specification products when feed to the fractionator has stopped and below a predetermined maximum value for said second signal which value further decreases upon increasing the feed rate, means for passing said second signal to said computer as the internal reflux set point thereof so that the computer can compute the external reflux rate required for the flow rate sensed, a flow sensing means operatively connected to said reflux conduit, a valve means operatively connected to said reflux conduit downstream from said flow sensing means, a flow controlling means operatively connected to both said valve means and said flow sensing means and adapted to regulate the opening of said valve means to make the flow of reflux in said reflux conduit as sensed by said flow sensing means to be substantially the same as the set point for said flow controlling means, means for operatively connecting the output of said computer to the set point means of said flow controlling means so that the external reflux flow rate needed as computed by the computer is applied to the flow controlling means as the set point thereof.

References Cited
UNITED STATES PATENTS

| | | | |
|---|---|---|---|
| 3,227,631 | 1/1966 | Stine | 202—160 |
| 3,259,734 | 7/1966 | Marr | 203—2 |
| 3,268,420 | 8/1966 | Webber et al. | 203—2 |
| 3,271,270 | 9/1966 | Lupfer et al. | 202—160 |
| 3,271,269 | 9/1966 | Walker | 202—160 |
| 3,272,722 | 9/1966 | Walker | 203—2 |
| 3,296,097 | 1/1967 | Lupfer | 203—2 |

OTHER REFERENCES

Techniques of Process Control: Buckley; N.Y. 1964, Wiley and Sons, pp. 106–108.

WILBUR L. BASCOMB, JR., *Primary Examiner.*